(12) United States Patent
Finlay

(10) Patent No.: US 11,577,213 B2
(45) Date of Patent: Feb. 14, 2023

(54) ENERGY CONVERSION AND REACTION SYSTEM AND METHOD

(71) Applicant: Alan Finlay, Ross on Wye (GB)

(72) Inventor: Alan Finlay, Ross on Wye (GB)

( * ) Notice: Subject to any disclaimer, the term of this patent is extended or adjusted under 35 U.S.C. 154(b) by 128 days.

(21) Appl. No.: 17/188,219

(22) Filed: Mar. 1, 2021

(65) Prior Publication Data

US 2022/0274083 A1   Sep. 1, 2022

Related U.S. Application Data

(63) Continuation of application No. 15/753,712, filed as application No. PCT/EP2016/069838 on Aug. 22, 2016, now Pat. No. 10,960,378.

(30) Foreign Application Priority Data

Aug. 21, 2015 (GB) ..................... 1514895

(51) Int. Cl.
| | | |
|---|---|---|
| *B01J 19/00* | (2006.01) | |
| *H01M 14/00* | (2006.01) | |
| *B01J 19/08* | (2006.01) | |
| *H01M 8/1231* | (2016.01) | |
| *H01M 8/06* | (2016.01) | |

(52) U.S. Cl.
CPC ......... *B01J 19/0093* (2013.01); *B01J 19/085* (2013.01); *B01J 19/088* (2013.01); *H01M 8/06* (2013.01); *H01M 8/1231* (2016.02); *H01M 14/00* (2013.01); *B01J 2219/0093* (2013.01); *B01J 2219/00788* (2013.01); *B01J 2219/00853* (2013.01); *B01J 2219/00927* (2013.01); *B01J 2219/00948* (2013.01); *B01J 2219/0807* (2013.01); *B01J 2219/0849* (2013.01); *B01J 2219/0875* (2013.01); *B01J 2219/0883* (2013.01); *C01B 2203/04* (2013.01); *C01B 2203/066* (2013.01)

(58) Field of Classification Search
CPC ......... H01M 14/00; H01M 8/06; Y02E 60/50; B01J 2219/00927; B01J 19/085; B01J 2219/0093; B01J 2219/0883; B01J 19/00
See application file for complete search history.

(56) References Cited

U.S. PATENT DOCUMENTS

2012/0228492 A1* 9/2012 Franzen ............... H01J 49/401
250/288

* cited by examiner

*Primary Examiner* — Anca Eoff
*Assistant Examiner* — Monique M Wills
(74) *Attorney, Agent, or Firm* — Stephen T. Scherrer; Monique A. Morneault; Scherrer Patent & Trademark Law, P.C.

(57) ABSTRACT

A system is described that is capable of operating as an energy conversion system that functions as a fuel cell and generates electrical current from a fuel or fuels, or as a reactor for conversion of starter materials into more complex molecules through ion-ion and ion-molecules and which may preferably be adapted to operate as a gas to liquid (GTL) process. The system ionises at least one fuel or starter material and manipulates, selects and transports ions for reaction by means of suitable electrostatic or electrodynamic ion guides, filters or drift tubes. The system of the present application replaces the electrolyte, catalyst and/or membrane found in classic fuel cells or GTL processes with an electrostatic or electrodynamic ion manipulation region such as an ion guide, analyser, drift tube or filter.

17 Claims, 5 Drawing Sheets

ENERGY CONVERSION AND REACTION SYSTEM AND METHOD

FIELD OF THE APPLICATION

The present application relates to conversion of gas into electrical power or liquid(s) by means of ionic reactions in the gas phase. The present application concerns a technology that may be operated as a means of producing electric power or liquid product(s) from at least one gaseous input stream. An apparatus based on this technology is described that may function as a fuel cell and as a gas to liquid (GTL) conversion system.

BACKGROUND

Fuel cells convert fuel from a fuel reservoir directly into electrical current. GTL plants convert natural gases such as methane into liquid fuels such as methanol or ethanol that can be easily stored and transported.

A critical feature of existing fuel cell and gas to liquid processes is the requirement for a catalyst and, in the case of fuel cells, an electrolyte. In most modern fuel cells the electrolyte is an ionic membrane. These features require careful engineering and selection of materials. Frequently precious or rare earth metals are utilised, contributing to the expense of the device. The use of precious metals as catalytic materials, and the price volatility of commodities, can make fuel cells and GTL technologies uneconomic. The reliability and longevity of these devices is limited by gradual deterioration of the effectiveness of catalytic materials due to mechanisms such as coating, deposition and oxidation. The overall efficiency of the cell or GTL process falls over time unless expensive materials are used. Similarly membranes and electrolytes exploited in fuel cells gradually deteriorate over time due to changes in their chemical composition and because of crystallisation, oxidation and coating with impermeable films or dielectric layers.

Patent document U.S. Pat. No. 6,924,401 B2 describes a plasma reforming process relying on random collisions of neutral (uncharged) molecules from starter materials (i.e. Oxygen, Methane) with ions and electrons in a local plasma, and their subsequent ionisation and reaction to produce a small quantity of Methanol. These reactions are unguided and consequently the overall yield is limited by the number of molecules that can intersect and collide in the small volume of the plasma, and then only a minority follow a reaction pathway that results in methanol.

Other examples of plasma reforming systems and methods are found in the following documents: "A review of direct methane conversion to methanol by dielectric barrier discharge" from Antonius Indarto, in IEEE Transactions on dielectrics and electrical insulation, September 2008; JP2004285187A; JPH10182521A; "Single Step oxidation of methane to methanol—towards better understanding", P. Khirsariya, R. K. Mewada, Procedia Engineering 51 (2013) 409-415; "The future of GTL—Why smaller scale GTL still makes sense in a low-oil price world", Jeff McDaniel, GTL Technology Forum, Houston, Jul. 29-30th 2015; "The impact of catalyst-reactor performance on commercial GTL plant design and operation", Dr. Paul F. Schubert & Andre P. Steynberg, GTL Technology Forum, Houston, Jul. 29-30th 2015; WO2004024280A2, WO2010041113A1 and WO2013020042A1, the entire contents of which are herein incorporated by reference.

SUMMARY

A device and method are described that eliminates the conventional requirement for electrolyte and catalyst in a fuel cell or GTL device.

There is provided an energy conversion device comprising at least one first ionisation region and at least one second ionisation region to generate ions from respective input streams of starting material; and at least one ion manipulation region for conveying generated ions from one or both of the at least one first ionisation region and the at least one second ionisation region to facilitate a reaction between the generated ions of the respective streams, wherein the ion manipulation region comprises at least one ion guide for filtering the generated ions.

In a particular case, the one or both of the at least one first ionisation region and the at least one second ionisation region are configured to provide a soft ionization of the starting material.

In another particular case, the soft ionisation is provided by one of the following techniques: chemical ionisation, electrospray ionisation, microspray, nanospray ionisation, photoionisation, laser ionisation, field effect ionisation, electron impact, low temperature plasma ionisation, glow discharge ionisation, secondary ionisation, charge transfer and corona discharge ionisation.

In another particular case, the at least one ion guide comprises one of the following: mass analyser, ion mobility spectrometer.

In another particular case, the energy conversion device employs low loss ion optics for coupling the at least one ion manipulation region to the at least one first ionisation region and the at least one second ionisation region.

In another particular case, the low loss optics comprises one of the following: RF-only ion guide, electrostatic lenses, Brubaker lens, einzel lens, stacked rings, cylinder lens or ion funnel, pre-filters, hexapoles, quadrupoles, octopoles, ion mobility, drift tubes, travelling wave ion guides, stacked ring ion guides, bunching optics or Stark decelerators.

In another particular case, the energy conversion device comprises in the ion manipulation region a trap to collect and filter the generated ions.

In another particular case, the trap comprises one of the following: quadrupole, rectilinear, linear, toroidal or cylindrical ion trap.

In another particular case, the at least one ion guide further comprises an ion filter for selectively transferring the generated ions according to one or both of their mass to charge ratio and ion mobility.

In another particular case, the at least one ion manipulation region the at least one first ionisation region and the at least one second ionisation region are constructed from microfabricated components.

In another particular case, the at least one first ionisation region and the at least one second ionisation region have opposite polarities.

There is also provided an energy conversion system comprising an array of devices as described above.

There is also provided a Gas To Liquid device comprising a device as described above.

In a particular case of the Gas To Liquid device, the starting material for the at least one first ionisation region is one of the following: methane, hydrogen, ethane, butane, pentane, methanol or ethanol and the starting material for the at least one second ionisation region is one of the following: oxygen, air, water.

There is also provided a fuel cell comprising a device as described above.

In a particular case of the fuel cell, the starting material for the at least one first ionisation region is one of the following: hydrogen or positive or protonated ions and the starting material for the at least one second ionisation region is oxygen.

There is also provided a method for energy conversion comprising: generating ions from respective input streams of starting material in at least one first ionisation region and at least one second ionisation region; conveying generated ions in at least one ion manipulation region from one or both of the at least one first ionisation region and the at least one second ionisation region to facilitate a reaction between the generated ions of the respective streams; wherein the method further comprises filtering the generated ions in at least one ion guide of the ion manipulation region.

In a particular case, the method further comprises selecting the generated ions in the at least one ion manipulation region according to one or both of their mass to charge ratio and ion mobility.

In a particular case, generating the ions comprises a soft ionization of the starting material in the at least one first ionisation region and the at least one second ionisation region.

In a particular case, the soft ionisation comprises one of the following: chemical ionisation, electrospray ionisation, microspray, nanospray ionisation, photoionisation, laser ionisation, field effect ionisation, electron impact, low temperature plasma ionisation, glow discharge ionisation, secondary ionisation, charge transfer and corona discharge ionisation.

In a particular case, the at least one ion guide comprises one of the following: mass analyser, ion mobility spectrometer.

In a particular case, the method further comprises coupling the at least one ion manipulation region to the at least one first ionisation region and the at least one second ionisation region with low loss ion optics.

In a particular case, the method further comprises collecting and filtering the generated ions in a trap of the ion manipulation region.

In a particular case, the method further comprises selectively transferring the generated ions according to one or both of their mass to charge ratio and ion mobility.

In a particular case, the at least one first ionisation region and the at least one second ionisation region have opposite polarities.

The present application is efficient and readily scalable. An advantage of the device of the present teaching includes, for example, but is not limited to trapping positive and negative ions in the same volume or in close proximity, i.e. in a sub millimetre range, in adjacent ion guides for reaction in an intermediate region. With the device of the present teaching, a very high charge density, of $10^6$ ions or greater, may be achieved increasing yield and throughput, e.g. using quadrupole ion guides rather than traps.

The use of an ion guide permits the separation of ions from neutral particles, enriching the input stream. The presence of other neutral particles may reduce efficiency by providing alternative and less desirable reaction pathways, reducing the overall throughput. Using the ion guide to separate ions from neutrals enriches the reaction pathway and discriminates in favour of the reactants so that only the ions proceed to the reaction region, and neutral molecules are pumped away. Furthermore, the selection of ions by their mass to charge ratio or ion mobility permits greater specificity in reactions by combining desired molecules only, and rejecting others. Hence the device of the present teaching provides a higher selectivity than plasma reforming permitting production of methanol and other products without catalysts in ambient conditions.

In the present application, ions are generated separately and then extracted from the surrounding neutrals by means of ion guides, and then transported as an enriched, reactive, ionic stream to the a region where they are focussed, combining to generate the desired reaction products. If the starter ions are selected by mass to charge or mobility, the overall yield is increased further. The reacting ions are focussed and combined into an undiluted stream by means of the ion guides.

The technology of the present application does not suffer from the disadvantages of membranes or catalysts outlined above, and may be constructed from commonplace materials such as stainless steel and cheap ceramic insulators.

Therefore, the benefits of the technology of the present application include low materials costs, reliability, stability and longevity.

At the heart of the chemical reactions occurring in processes such as the electrical fuel cells and GTL is chemical reduction and oxidation. Chemical oxidation results in the loss of electrons, whereas chemical reduction results in a gain of electrons. Together these processes are known as 'redox' reactions. These reactions may be promoted by presence of certain reactants, catalysts and accelerated by heat, pressure and the adjustment of composition and flow rates. Intermediate compounds are frequently formed before the reaction products. In the case of GTL processes 'syngas', an intermediate mixture of carbon monoxide, hydrogen, and carbon dioxide is formed in a high temperature transformation of methane prior to the formation of methanol. In the device of the present application, chemical ionisation is exploited to promote oxidation and reduction in positive and negative ionisation regions respectively. The ionisation products are then transferred for reaction together to form the desired reaction products by means of an ion transportation device, or ion guide. In this way the use of ionisation regions displaces the electrolyte and catalysts of a fuel cell, and the ion guide supersedes the membrane. Similarly, the utilisation of ionisation regions overcomes the necessity for unique reaction conditions in GTL plant, such as elevated temperature, pressure and catalysts, whereas the ion guide supplants catalysts. If the technology of the present application can be constructed from widely available materials such as stainless steel and standard ceramic insulators, the significant advantages in cost and reliability may be achieved as asserted above.

Advantages of the system of the present application include: its ability to start from cold, without the need to head catalysts or reaction vessels to some optimum temperature; that it produces no heating and does not require intricate heat transfer features such as radiators or coolant flow through micro-channels; that it runs off humid air; it runs off a variety of fuels comprising a range of hydrocarbons; that there is no liquid electrolyte but rather a selective means of transfer; that the absence of an electrolyte means it cannot clog with carbon; that it is scalable; that no rare earth or precious metals are required; that it has no moving parts and that the widespread availability of stranded gas, which is otherwise flared, means that a substantial market opportunity exists for a reliable, cost effective means of generating electric power or liquids from natural gas both offshore and onshore.

Ionisation is a process whereby neutral molecules can gain or lose charge. Ionisation sources typically impart or draw electrons from molecules in the presence of electrodes and strong electrical fields. There are many ionisation sources: the list of ionisation sources includes electron ionisation, photoionization, chemical ionisation, corona discharge, radioactive ionisation, electrospray ionisation, electrosonic ionisation and thermal ionisation. Some of these ionisation techniques operate in vacuum conditions while other ionisation techniques are possible under ambient condition. These are known as atmospheric pressure or ambient ionisation and include electrospray, microspray, nanospray and atmospheric pressure chemical ionization sources. The ionisation technique is typically selected based on the chemistry of the molecules to be ionised. For example, polar molecules ionise well in electrospray sources, whereas non-polar molecules such as hydrocarbons ionise in chemical ionisation sources. Some ionisation techniques such as electron ionisation are considered to be 'hard' since they result in fragmentation of molecules during ionisation. Others are described as 'soft' since the molecule is largely preserved and a so-called molecular or pseudo-molecular ion is formed, preserving most of the chemical bonds in the group. A further category of ionisation techniques relies on the creation of secondary ions from primary ions generated in a source. The primary ions are known to ionise other molecular species using processes such as change transfer or dissociation. An example under vacuum conditions is chemical ionisation, which utilises an electron ionisation source in a higher pressure region to generate primary ions from a supply of known chemical known as an adduct. These primary ions then react with specific analyte molecules in a second region to generate detectable product ions. Other examples that occur under ambient conditions include secondary electrospray ionisation and direct electrospray ionisation.

In the technology of the present application an ionisation region is constructed. The ionisation region incorporates an ionisation source. The ionisation source is used to generate ions from an input stream of starting material. The input stream could be a fuel such as methanol, ethanol, methane or hydrogen in the case of a fuel cell, or methane in the GTL plant instance. The ionization region is preferably operated at ambient conditions (e.g. atmospheric pressure and temperature) for reasons of throughput, cost, complexity and efficiency. Examples of atmospheric pressure ionisation techniques include electrospray ionisation, microspray, nanospray ionisation, photoionisation, laser ionisation, field effect ionisation, electron impact, glow discharge ionisation and corona discharge ionisation or any other ionisation technique that generates ions for manipulation within the device of the present application. The ionisation region is operated to generate ions from the input stream.

The present application includes an ion transfer region which incorporate means for controllably conveying ions from the ionisation region, such as an ion guide. The ion transfer region is coupled to the ionisation region.

Examples of ion guides include ion mobility, field asymmetric ion mobility and differential ion mobility, as well as DC, AC or radio-frequency driven stacked rings, monopoles, quadrupoles, hexapoles or octopoles. Guides may be used to transport ions in a DC or AC field, or some combination of fields. Certain AC or RF ion guides operate by creating a 'pseudo-potential well' within which ions are stable. Some ion guides may be operated to selectively transport ions of a certain m/z ratio, or range of ratios, and filter out all other ions. Preferably the ion transfer region may be operated at ambient conditions for reasons of throughput, cost, complexity, efficiency and reliability. Examples of ion guides that may utilised at, or near, ambient pressure and temperature include ion mobility, field asymmetric ion mobility and differential ion mobility, as well high pressure RF ion guides such as transfer quadrupoles that exhibit collisional focussing of ions inside the guide at partial vacuum pressures that are near atmospheric pressure. Thanks to the use of a pseudo-potential well in which the ions may be stably trapped without discharging on electrodes for long periods, the operation may last over long periods of time, trapping ions for hours or even days.

Inside the ionisation region the input stream is ionised such that charge is lost or gains by means of oxidation or reduction at the positive and negative electrodes respectively. More than one ionisation region may be required to generate the primary ions necessary for combination into the desired reaction product. Positive and negative ion sources may be needed. If we take the instance of the positive ion source, neutral molecules lose charge to the positively charged electrode, or transfer charge to positively charged primary ions, and become positively charged ions. If primary ions are carefully selected an 'electrochemical series' may be contrived between the primary ion and the neutral molecule such that that the neutrals are preferentially ionised in a desired configuration. Preferably the ionisation region is operated under ambient conditions, so a desirable configuration utilises an atmospheric ionisation technique e.g. corona discharge or electrospray ionisation.

The ionization region is coupled to the ion transfer region. Ions are generated in the ionisation region and are drawn into the transfer region by means of a thermal gradient, a magnetic or electrical field, or by flow induced by a pressure differential. If more than one ionisation source is employed, they may be connected by means of an ion transfer region or regions. Ions are transported inside the transfer region by means of an ion guide or guides. In this way ions of opposite polarity may be transferred for combination and neutralisation inside an ion guide. Reaction products may be formed inside the ion guide and collected as neutral molecules in the gas phase. Methods of collecting reaction products could include condensation, distillation, separation and purification of a vapour stream from the ion transfer region.

Electrodes of the ionisation source are connected via an external circuit to the poles of a power supply for operation. Charge lost to the positive electrode flows as electric current through a circuit connected to an oppositely charged electrode, or in the case of a system of the present application incorporating more than one ionisation region, to an oppositely (in this case negatively) charged ionisation source. If charge transferred from the input stream exceeds the current drawn by the ionisation source from a power supply, the circuit may be operated as a fuel cell. To complete the circuit, however, ions must be transferred to an electrode of opposite polarity. In a conventional ion source, ions are drawn to an oppositely-charged counter electrode inside the source where they ground and complete the circuit. In an example of the present application, ions are transferred to oppositely charged ionization sources by means of an ion guide as described above. Therefore the ion guide operates in an analogous manner to the electrolyte or membrane found in a classical fuel cell.

In an example of operation of the present application as a GTL device, methane is ionised in a first, positively charged ionisation source and water is ionised in a second, negatively charged ionization source. Methane is non-polar, so preferably an atmospheric chemical ionization (APCI) source may be employed in the ionisation regions to generate the desired molecular ions for subsequent transfer and combination. In one example of the present application an APCI utilises corona discharge to generate positive or negative ions around a suitable field-concentrating electrode, such as a needle. Similarly electrospray ionization may be used to generate ions from weakly polar compounds such as water. Positively charged CH+ ions and negatively charged OH– ions are conducted from the respective positive and negative ionisation sources via an ion guide to combine into neutral methanol ions. Reactant products such as methanol may be collected from the exhaust of the device by means of condensation. Charge is conducted via an externally connected electrical circuit.

In an example of operation of the present application as a fuel cell, hydrogen is ionised in a first, positively charged ionization source and oxygen is ionisation in a second, negatively charged ionization source. In a preferred example an atmospheric pressure ionisation technique is employed, one example of which is APCI. Positive H+ ions and negative O– ions are transferred from their respective sources by means of an ion guide inside an ion transfer region. The ion guide performs the function of the membrane or electrolyte found in a classical fuel cell. Charge is conducted from the positive electrode of the first ion source via an externally connected electrical circuit to the negative electrode of the second ion source. A load may be applied if the charge transferred exceeds the initial EMF required to prime the cell, and work may be done.

In a preferred example the ionisation region is operated at atmospheric or near atmospheric pressure. Similarly, to reduce or eliminate the additional complexity and power consumption of a vacuum pump, the ion transfer region, ion filter or ion guide is also operated at atmospheric, or near atmospheric, pressure.

Operation of the ion guide at higher pressure promotes condensation and precipitation of liquids formed when sufficient numbers of neutral molecules are generated during ion-ion and/or ion-molecule reactions. Examples of ion transfer techniques that operate at atmospheric, or near atmospheric, pressure and based on DC and RF voltages include ion mobility spectrometry (IMS), high field ion mobility (HFIMS), drift tube, field asymmetric ion mobility (FAIMS), differential ion mobility, travelling wave ion guides, stacked ring ion guides, ion funnels, ion traps and monopole or multipole (quadrupole, hexapole or octopole) ion guides or structures for lossless ion mobility (SLIM) constructed from at least one electrode.

An ion guide, ion filter, ion transport or ion transfer region that is effective at these pressures will generally be operated at lower RF and/or DC voltages to prevent electrical discharge or breakdown between electrodes. At lower voltages, the ion guide may be constructed from a range of smaller critical dimensions, for example with an inscribed radius of between 0.1 and 3.0 mm (cf. "Miniature Mass Spectrometer Systems Based on a Microengineered Quadrupole Filter", Analytical Chemistry 2010 and "A miniature mass spectrometer for liquid chromatography applications", Rapid Communications in Mass Spectrometry, 2011 and Syms R, Wright S, 2016, "MEMS Mass Spectrometers: the Next Wave of Miniaturization", Journal of Micromechanics and Microengineering, Vol:26, for some relevant examples of microengineered ion guides and the dimensions of their electrodes) using miniature electrodes, and RF voltages may be driven at higher frequencies. In these conditions, the mean free path between collisions between ions and neutral molecules can be shorter. More frequent collisions between charged particles and neutral molecules gives rise to collisional focussing within the ion guide which can improve transfer efficiency between ion guides, through apertures and from ionisation regions.

A preferred means of constructing a miniature ion guide or ion transfer region is using microfabrication processes. The ion transfer device may be constructed from printed circuit boards using lithography, or from a suitable insulating substrate such as plastic, silicon or ceramic using micromachining steps such as laser etching, chemical etching, electroplating, electroforming, anisotropic or isotropic etching and plasma etching and so on. The insulating substrate may be patterned and etched with suitable conducting material to generate miniature electrodes. When voltages are applied to these electrodes, provided they are suitably insulated and electrically separated, electric fields are created that may be utilised to transfer ions generated at the ionisation regions, and to transport, filter and react these ions with molecules and/or ions generated at other ionisation regions. Many examples of micromachined, micro-electromechanical (MEMS) or microsystems devices existing including microfabricated ion guides, ion filters, ion traps or ion transfer devices. The ion guide may be assembled from electrodes and other features microfabricated on planar substrates. The advantage of using such miniature devices is that they may be readily scaled into massive parallel or serial arrays to improve throughput. Thus for example, by using microengineered quadrupole ion guides a reasonably compact form is possible allowing for arrays to be co-formed which can increase yield and output. It will be appreciated that techniques for constructing such arrays would be well known to the person skilled in the art, for example as evidenced by the very large ion guide array described in EP2058837A2, the entire contents of which are incorporated herein by reference.

Processes possible include ion-molecule reactions include the ionisation of water and combination of hydroxyl ions (OH–) with methane molecules to create methanol (or with ethane or butane to create ethanol or butanol respectively), or the separate ionisation of water and methane at the cathode and anode respectively to generate negative hydroxyl ions and positive methane ions, and their combination in an ion-ion reaction to create methanol (or ethanol or butanol etc.). While these ion-ion and ion-molecule reactions are possible in an ionisation region, they do not occur selectively and therefore their reaction efficiency is limited. The addition of a selective ion transfer region, based on a suitable ion guide, trap or filter, is utilised to select the 'starter' ions for combination with neutral molecules from a rich background, or other ions (which may have also been selected as starter ions) to generate the desired reaction products. The desired ions may be selected in an ion guide by their mass to charge ratio, before being combined in a reaction area either inside the ion guide or at the intersection of more than one ion guide.

The ionisation region, or regions, coupled with ion transfer regions, ion guides and/or ion traps may be integrated from microfabricated components and assembled into individual cells. These cells may then be stacked in parallel and scaled up into very large arrays depending on the desired throughput, flow rates and power output. Key factors in the overall efficiency will include the ionisation efficiency of the ionisation regions, the transmission efficiency of the ion transfer regions (taking into account coupling between these regions), the efficiency of the selected ion-ion or ion-molecule reactions and the collection efficiency of the condensed reaction products.

In one example of the present application at least one ionisation region is coupled with at least one ion transport region for manipulation and control of reactions of ions with surfaces, ions or molecules. The ionisation region generates charged particles or ions from starter materials or fuels such as natural gas, air and water. The natural gas may contain methane, ethane, butane and heavier hydrocarbon molecules prior to ionisation in the ionisation region to form molecular ions.

The ionisation region may be based on a soft ionisation technique such as glow discharge or electrospray ionisation to form molecular product ions either directly or by charge transfer. The advantage of using 'soft ionisation' such as electrospray or glow discharge ionisation is that ionisation efficiency is increased so boosting overall efficiency.

These product ions may be coupled into an ion transport or manipulation region and conveyed to a reaction region for combination with other ions or neutral molecules. The ions may be filtered and selected by the mass to charge ratio within the ion manipulation region. The ion manipulation region may include a trap to collect ions prior to introduction of a gas bearing neutral molecules for ion molecule reactions to generate the desired reaction products. The trap may be a quadrupole, rectilinear, linear, toroidal or cylindrical ion trap or some other ion trap to collect and filter ions for reaction. Alternatively the ion manipulation region may rely on a technique operating at higher pressures, i.e. close to, just below or at, ambient pressure rather than at vacuum, to transport, select and finally reaction ions at atmospheric pressure or higher such as ion mobility, differential ion mobility, structures for lossless ion transport or travelling wave or some other ion mobility section. Ideally, the ion manipulation region operates at higher pressures, for example between $1 \times 10^{-3}$ and 760 Torr, to reduce pumping requirements, power consumption and complexity (cf., "MEMS Mass Spectrometers: the Next Wave of Miniaturization", Syms R, Journal of Micromechanics and Microengineering, Vol:26 2016 for some relevant examples of miniaturized ion guides and their operating conditions). A second ionisation region may be included to produce ions from water, oxygen or some other fuel or starter materials. These ions may include hydroxyl ions or other functional groups that may be combined with molecular ions generated from hydrocarbon starter materials in the first ionisation region to generate desired reaction products such as ethanol, butanol etc. via ion-ion reactions in the ion manipulation region. The ions generated in each ionisation region are coupled into the ion manipulation region using suitable, low loss ion optics with an ion transmission efficiency of 1% to more than 70% such as an ion guide, Brubaker lens, electrostatic lens, einzel lens, stacked rings, stark electrodes, cylinder lens or ion funnel. Similar, flow of a carrier gas that is inert or unlikely to react with the ions generated in the ionisation regions may be employed to propel them into the ion manipulation region. The ions from at least one ionisation region are combined in ion-ion reactions inside an ion guide, trap, pseudopotential well or reactor where they combine and, once they are neutralised, condense for collection at the bottom or walls or outlet of the reaction vessel. The ions may be filtered prior to combination using mass analysers, filters or traps, or intermediate reaction products may be selected for reaction to form the desired reaction products. Similarly, ions may be filtered and reacted with neutral molecules, or with reactive surfaces, or with ions, surfaces and neutrals in a series of reactions to build more complex molecules with greater functionality.

Discharging ions on the opposite electrode of an ionisation region of opposite polarity release charge and form current flow in an external circuit. The ions may be selected in the ion manipulation region and transported to the opposite polarity electrode of the second ionisation region. In this fashion the ion manipulation region or ion transport region functions as a membrane in a fuel cell. In one example of the present application functioning as a fuel cell, positive or protonated ions which, in their simplest form are positively charged hydrogen ions, are generated at a first ionisation region. Positive ions lose charge to the positive electrode of the ionisation region. This charge flows via an external circuit connected via some load to the negative electrode of the second ionisation region. These positive ions are coupled with a second ionisation region of opposite polarity via an ion manipulation region. The ion transport or manipulation region may be capable of selection of ions by mass to charge ratio to the exclusion of all others. In one example the ion transporter is a miniaturised quadrupole mass analyser that can operate in RF-only mode to transport all ions, or with a DC component in selected ion mode (SIM) to permit ions of a given mass to charge ratio. A quadrupole assembled from microfabricated electrodes may operate at higher pressure, lower RF voltage and higher frequency. If lengthened, the frequency can drop along with the voltage accordingly. The ion transport region conveys positive ions from the positive electrode of the first source to the negative electrode of the second source where they discharge on impact with the negative electrode, or via charge transfer, and complete the circuit. Increased flow of fuel to the two ionisation regions ought to increase ion current transmitted through the ion guide between them, thereby increasing current in the external circuit to a level capable of performing work. Again, transmission efficiency between ionisation regions via an ion guide will be critical, so coupling of ionisation regions with the ion transporting region relies on low-loss ion optics such as RF-only ion guides, pre-filters, hexapoles, quadrupoles, octopoles, ion mobility, drift tubes, travelling wave ion guides, stacked ring ion guides or some other low-loss, or lossless, ion transport mechanism.

Hence the system of the present application is capable of operating as an energy conversion system that functions as a fuel cell and generates electrical current from a fuel or fuels, or as a reactor for conversion of starter materials into more complex molecules through ion-ion and ion-molecules and which may preferably be adapted to operate as a gas to liquid process. The system of the present application ionises at least one fuel or starter material and manipulates, selects and transports ions for reaction by means of suitable electrostatic or electrodynamic ion guides, filters or drift tubes. The system of the present application replaces the electrolyte, catalyst and/or membrane found in classic fuel cells or GTL processes with an electrostatic or electrodynamic ion manipulation region such as an ion guide, analyser, drift tube or filter.

These and other features will be better understood with reference to the following drawings which provide the person of skill with an understanding of the present teaching but in no way is intended to limit the present teaching.

BRIEF DESCRIPTION OF THE DRAWINGS

The present application will now be described with reference to the accompanying drawings in which.

DETAILED DESCRIPTION

The system of the present application is described with reference to the FIGS. 1 through 4. The system may operation as a fuel cell or as process for converting gases to more complex molecules through the addition of different functional groups in ion-ion and ion-molecule reactions. The system may form a module that may be scaled or stacked, or assembled into very large arrays (arrays of 10×10 cells or greater) to scale its power output, our liquid output, depending on its mode of operation.

Figure 1:
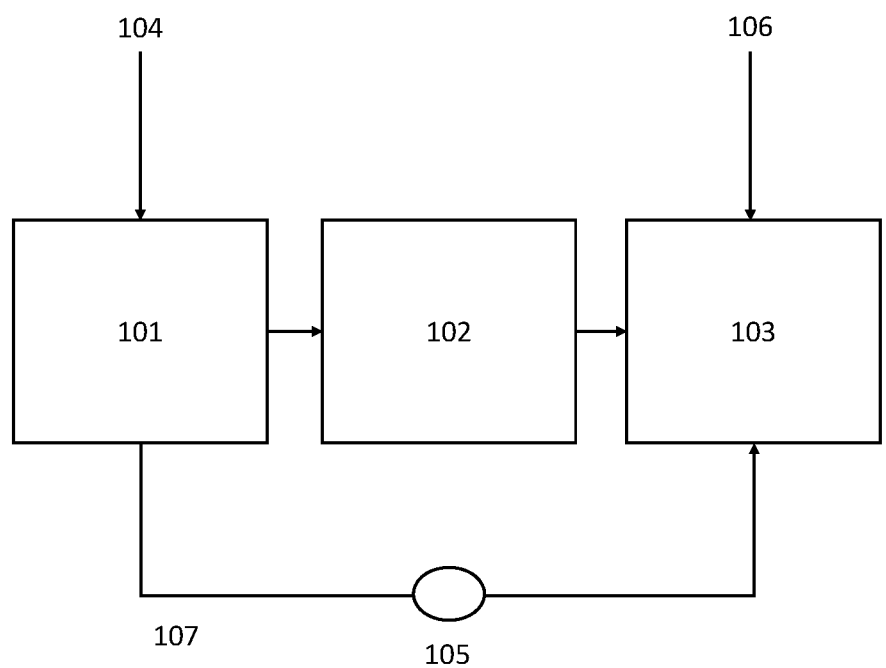
FIG. 1 shows a schematic of the system of the present application.

FIG. 1 is a schematic of the system of the present application including its primary regions, a first ionisation region 101, an ion manipulation region 102 and a second ionisation region 103. A least one fuel or starter material 104 and 106 is shown entering ionisation regions 101 and 103 respectively. When the system of the present application is operated as a fuel cell the ionisation regions 101 and 103 include ion sources that have opposite polarity.

These fuels or starter materials are ionised inside regions 101 and 103, preferably using a soft ionisation technique to generate a molecular, or pseudo-molecular ion. The ionization region 101 or 103 is preferably operated at ambient conditions (e.g. atmospheric pressure and temperature) for reasons of throughput, cost, complexity and efficiency. Examples of suitable pressure ionisation techniques include electrospray ionisation, microspray, nanospray ionisation, photoionisation, laser ionisation, field effect ionisation, electron impact, glow discharge ionisation, secondary ionisation, charge transfer and corona discharge ionisation or any other ionisation technique that generates ions for manipulation within the device of the present application. These ions are coupled into an ion manipulation region 102 using suitable ion optics. Preferably these ion optics are efficient at ambient conditions. The ion manipulation region 102 is also preferably capable of operation at ambient conditions and may be composed of suitable ion guides, filters, analysers or drift tubes. The ion manipulation region 102 conveys ions from ionisation region 101 into region 103 to complete a circuit linking electrodes of opposite polarity inside regions 101 and 103. Charge moves through an external circuit 107 to power load 105. The system of FIG. 1 is a module that may be stacked or assembled in parallel or in series into very large arrays to scale its power output.

Figure 5:
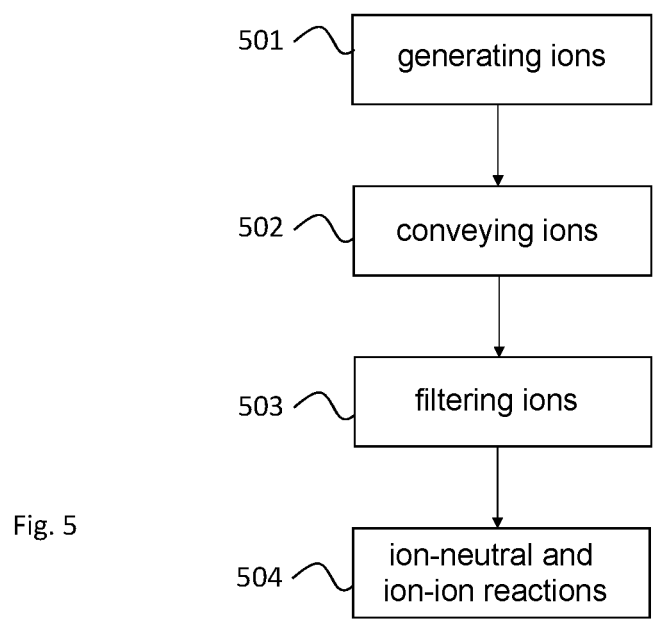
FIG. 5 shows a schematic diagram of the method of the present application.

The method of the present application is described with reference to FIG. 5. The method for energy conversion comprises: generating 501 ions from respective input streams of starting material in at least one first ionisation region and at least one second ionisation region; conveying 502 generated ions in at least one ion manipulation region from one or both of the at least one first ionisation region and the at least one second ionisation region to facilitate a reaction between the generated ions of the respective streams; and filtering 503 the generated ions in at least one ion guide of the ion manipulation region. The ions may then react with other ions or neutral species at step 504.

Figure 2:
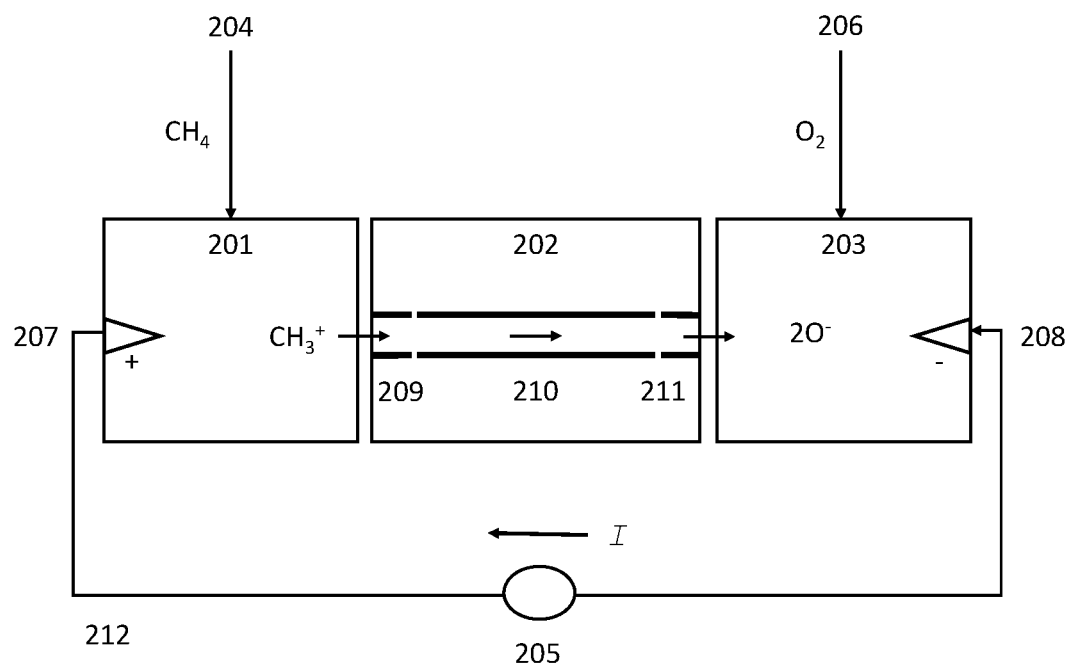
FIG. 2 shows a schematic of the system of the present application operating as a fuel cell including ionisation regions and an ion transport region.

FIG. 2 is a schematic of the system of the present application operating as an energy conversion system, preferably a fuel cell. In this mode of operation a fuel enters 204 a first ionisation region 201 as an input stream. This fuel 204 is preferably, but not limited to, methane but may be another suitable fuel such as hydrogen, ethane, butane, pentane or an alcohol such as methanol or ethanol. A second fuel 206 enters a second ionisation region 203 as an input stream. This second fuel 206 is preferably, but not limited to, oxygen. In FIG. 2 methane, oxygen and their respective ion products are included for illustrative reasons only. These fuels could alternatively be hydrogen and oxygen, or ethane and oxygen etc. These fuels are ionised at ion sources 207 and 208 which include electrodes that are at opposite polarity. The ion sources 207 and 208 preferably rely on, but are not limited to, soft ionisation techniques such as electrospray, corona discharge, glow discharge ionisation etc. If the fuel 204 is a non-polar compound such as a hydrocarbon like methane, then an atmospheric pressure, soft ionisation technique such as corona discharge ionisation may be preferred for ion source 207. A positive ion is generated at 207 and transmitted into ion manipulation region 202. To optimise transmission suitable ion optics 209 and 211 may be employed to efficiently couple ions from 201 into 202 and 203 respectively. These ion optics 209 and 211 may be designed to have maximum acceptance to couple the species ionised at 207 or 208 into 202. Some examples of suitable ion optics with greater acceptance include, but are not limited to, RF-only ion guides, RF-only quadrupole prefilters, Einzel lens, cylinder lens, stacked ring electrodes, ion funnels, hexapoles, octopoles and monopoles. Inside ion manipulation region 202 is an ion guide or transporter 210 to convey ions from 201 via 202 into 203, or from 201 and 203 into 202, where they gain charge from oppositely charged ions generated at 208. The ion guide 210 may be capable of filtering ions by their mobility, drift time, acceleration, cross section, diameter and/or mass to charge ratio, so that only certain ions are transmitted. This ion transporter 210 may be a mass analyser or ion mobility spectrometer capable of selecting or separating ions such as a drift tube, FAIMS, HFIMS, SLIM, quadrupole mass analyser, ion trap, quadrupole ion trap, cylindrical ion trap, toroidal ion trap or rectilinear ion trap.

Preferably ion transporter 210, and optics 209 and 211, may be operated at ambient conditions to reduce system complexity, pumping requirements and voltages. Transmission of ions from 201 and 203 for combination inside 202, or from 201 through 202 for combination in 203, completes circuit 212 and provides current flow to power load 205. Likewise, positive ions from source 207 may be transported through 209, 210 and 211 for neutralisation at 208, or negative ions from 203 may be conveyed to 207 for discharge and completions of external circuit 212. The key feature is the potential for selective transmission of certain ions through 202 using ion filter 210. In this manner the need for a selective membrane that passes protons, or a catalytic surface, or an electrolyte is eliminated and the system of the present application may operate reliably for long periods of time without coating, clogging, charging, crystallisation or degrading of critical components. The system of FIG. 2 is a module that may be combined with other modules in series or parallel to form large arrays and scale-up power output. The sources 207 and 208 may be arrayed to increase ionisation and throughput of fuel, and increase ion current through 209, 210 and 211 and ultimately current flowing through external circuit 212 driving load 205.

Figure 3:
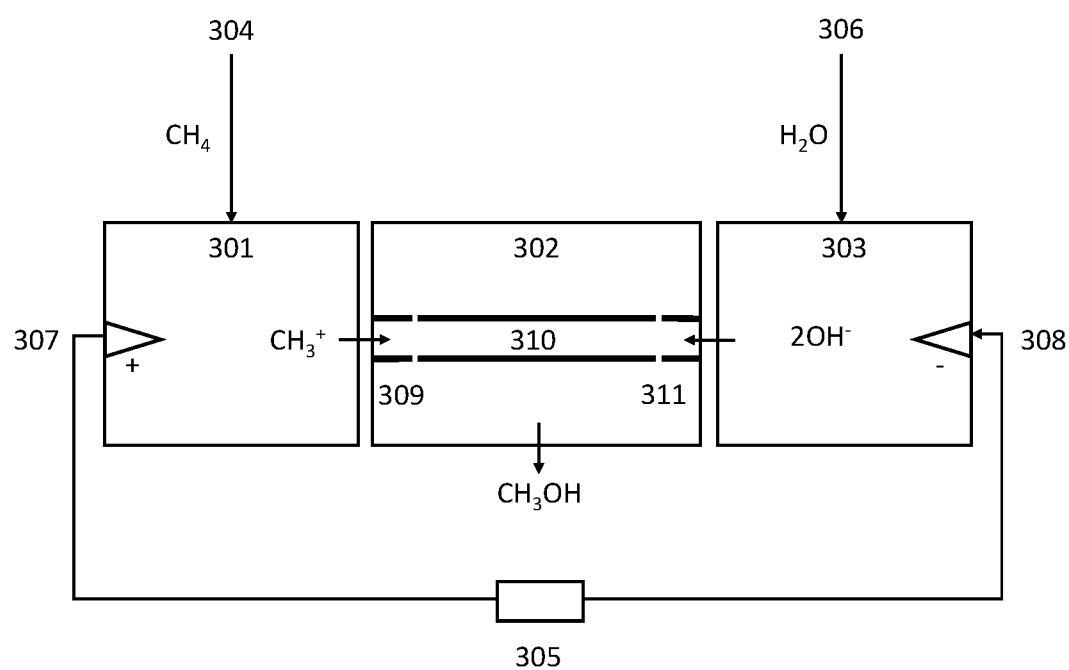
FIG. 3 shows a schematic of the system of the present application operating as a gas to liquid conversion process including ionisation regions and an ion transport region.

FIG. 3 is a schematic of the system of the present application in operation as a reactor rather than an energy conversion system, preferably as a gas to liquid process. Starter materials 304 and 306 enter at least one ionisation region 301 and/or 303 as input streams. Methane and water are shown purely for illustrative purposes and may be substituted with other compounds to generate reaction products of greater complexity and functionality than methanol as shown here. The starter materials are ionised in at least one ionisation source 307 and 308 respectively. It should be noted that in the system of the present application only one of the two ionisation regions may be necessary to generate ions which perform ion-molecule in 302, rather than the ion-ion reactions in 302 that are shown here. Ions generated at 307 and 308 are transferred into 302 via ion optics 309 and 311 respectively. Ion optics 309 and 311 are designed to maximise transmission efficiency from the at least one ionisation region 301 and/or 303 into ion manipulation region 302 The ion optics are designed such that their acceptance angle is maximised and coupled from one region to a second region is optimised and may be based on a RF-only ion guide, pre-filter, stacked ring electrode, SLIM, drift tube, HFIMS, FAIMS, Einzel lens, travelling wave ion guide, electrostatic lens or electrodynamic lens. The ion manipulation region 302 includes and ion transporter 310 which conveys or propels ions from ion optics 309 and 311 for reaction, combination, neutralisation or activation inside 310. The ion transporter 310 may be singular or plural and may also have the ability to select, filter or separate ions by characteristics such as mass to charge ratio, mobility, drift time, time of flight, cross sectional area (CSA) or diameter such as a mass analyser, quadrupole mass analyser, ion trap, quadrupole ion trap, rectilinear ion trap, linear ion trap, toroidal ion trap, magnetic sector etc. Numerous examples of miniaturised or microfabricated ion optical and filtering devices are known in the art. Electrode structures may be combined to generate a pseudopotential well when RF voltages are applied, efficiently focussing and transporting ions from one end of an ion guide to its exit. RF ion guides include stacked rings, ion funnels, quadrupoles, hexapoles and octopoles. The ionisation regions 301 and 303, and the ion manipulation region 302, are preferentially operated at ambient pressure and temperature to reduce system complexity, expense, cost, size and power consumption. The sources 307 and 308, the optics 309 and 311, and the transporter 310 may all be miniaturised or microfabricated from metal shim electrodes, planar electrodes, MEMS or printed circuit board assemblies wherein the electrodes form electrostatic or electrodynamic focussing, filtering or separating fields and the electrodes are spaced by suitable insulating materials. The ions generated from at least one source are focussed and if necessary filtered prior to combination or reaction with neutral molecules or other ions to form the desired reaction product or products. In an exemplary embodiment methane and water are starter materials which are ionised in respective ionisation regions, transported and selected for combination inside 311 to condense as methanol for collection in 302. A power source is provided at 305 to drive the ion sources 307 and 308 and ionise starter materials 304 and 305 as they are fed into regions 301 and 303.

Figure 4:
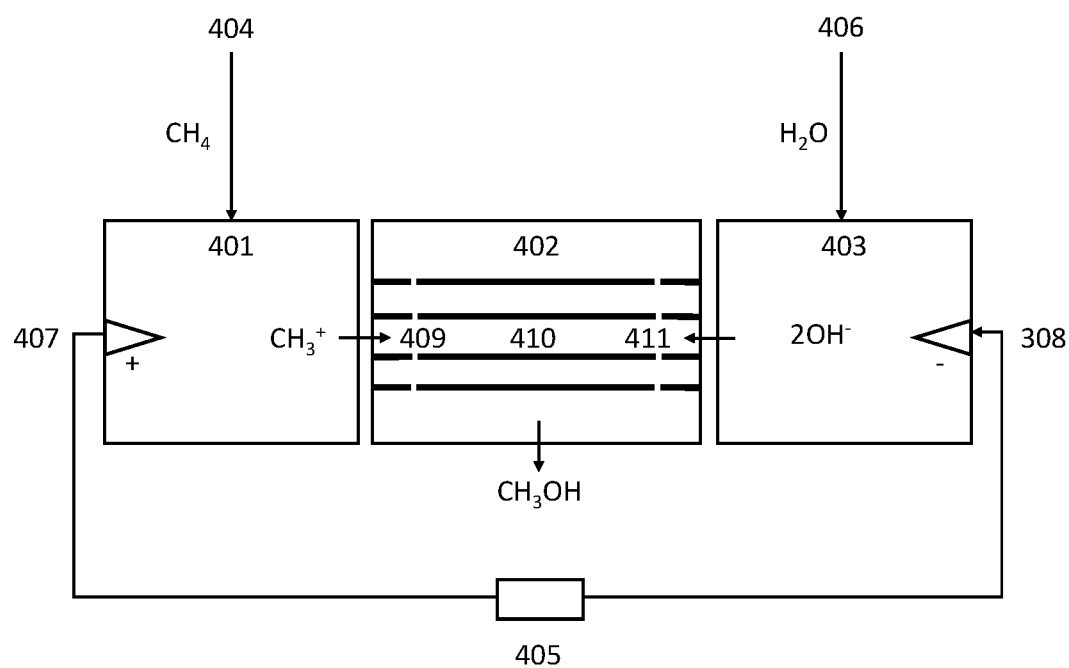
FIG. 4 shows a schematic of the system of the present application operating as a gas to liquid conversion process including ionisation regions and an array of ion transportation devices.

FIG. 4 illustrates the reaction system of FIG. 3 wherein the ion manipulation region 402 comprises a plurality of ion optics 409 and 411 and ion transporters 410 to scale-up the throughput of starter ions into 411 generating greater output of product for condensation and collection. Microfabricated arrays of electrostatic and electrodynamic ion optics, Brubaker lens and filters are known in the art.

Similarly sources 407 and 408 may be arrayed to increase ion current and ionisation efficiency of greater flow of starter materials 404 and 406. Starter materials 404 and 406 enter at least one ionisation region 401 and/or 403 as input streams Preferably the system in FIG. 4 is operated at atmospheric or near atmospheric pressure and temperature. The output products from 402 may be in turn an input stream and starter material into a further system of FIG. 4 for combination with another starter material to form more complex molecules with other functional groups. In an exemplary embodiment methane and water are combined to form methanol, which in turn may be combined with other starter materials to form waxes, paraffin and other heavier molecules. These modules of FIG. 4 may be combined in series or parallel to scale-up output. A power source is provided at 405 to drive the ion sources 407 and 408 and ionise starter materials 404 and 405 as they are fed into regions 401 and 403.

It is not intended to limit the present teaching to any one set of advantages or features of the preferred example as modifications can be made without departing from the present teaching.

Therefore, while exemplary arrangements have been described herein to assist in an understanding of the present teaching it will be understood that modifications can be made without departing from the scope of the present teaching. To that end it will be understood that the present teaching should be construed as limited only insofar as is deemed necessary in the light of the claims that follow.

The invention claimed is:

1. A gas to liquid conversion device for converting at least one input stream to a liquid reaction product, the device comprising:
   a first ionisation region, the first ionisation region comprising a plasma configured to generate ions from at least a first input stream of starting material, the first input stream comprising a gas; and
   at least one ion manipulation region for conveying generated ions from the first ionisation region, the at least one ion manipulation region comprising at least one ion guide for guiding the generated ions, the at least one ion manipulation region being configured to facilitate at least one of an ion-ion or an ion-molecule reaction to effect generation of a condensed reaction product, the condensed reaction product being output from the device as a liquid.

2. The device according to claim 1, comprising a second ionisation region and wherein one or both of the first ionisation region and the second ionisation region are configured to provide a soft ionization of starting material.

3. The device according to claim 2, wherein the soft ionisation is provided by one of the following: chemical ionisation, electrospray ionisation, microspray, nanospray ionisation, photoionisation, laser ionisation, field effect ionisation, electron impact, plasma ionisation, glow discharge ionisation, secondary ionisation, charge transfer and corona discharge ionisation.

4. The device according to claim 1, wherein the at least one ion guide comprises one of the following: mass analyser, ion mobility spectrometer.

5. The device according to claim 1, further comprising ion optics for coupling the at least one ion manipulation region to the first ionisation region.

6. The device according to claim 2, further comprising ion optics for coupling the at least one ion manipulation region to the second ionisation region.

7. The device according to claim 6, wherein the ion optics comprises one of the following: RF-only ion guide, electrostatic lenses, einzel lens, stacked rings, cylinder lens or ion funnel, pre-filters, hexapoles, quadrupoles, octopoles, ion mobility, drift tubes, travelling wave ion guides, stacked ring ion guides, bunching optics or Stark decelerators.

8. The device according to claim 1, further comprising a trap in the ion manipulation region for trapping the generated ions.

9. The device according to claim 8, wherein the trap comprises one of the following: quadrupole, rectilinear, linear, toroidal or cylindrical ion trap.

10. The device according to claim 1, wherein the at least one ion guide further comprises an ion filter for selectively transferring the generated ions according to one or both of their mass to charge ratio and ion mobility.

11. The device according to claim 2, wherein one or more of the at least one ion manipulation region, the first ionisation region and the second ionisation region are constructed from microfabricated components.

12. The device according to claim 2, wherein the first ionisation region and the second ionisation region are configured to have different voltages.

13. A conversion system comprising an array of devices according to claim 1.

14. The device of claim 1, wherein the starting material comprises one of the following: methane, hydrogen, ethane, butane, pentane, methanol or ethanol.

15. The device of claim 2, wherein starting material for the first ionisation region comprises one of the following: methane, hydrogen, ethane, butane, pentane, methanol or ethanol and starting material for the second ionisation region comprises one of the following: oxygen, air, water.

16. The device according to claim 1, configured to receive an input stream of a second starting material.

17. The device according to claim 16 wherein the input stream of the second starting material is coupled to a second ionisation region, the second ionisation region configured to generate ions from the second starting material.

* * * * *